Nov. 14, 1933.                R. J. NEEDHAM                1,935,329
                          FABRICATED VALVE BODY
                          Filed Dec. 16, 1929          2 Sheets-Sheet 1
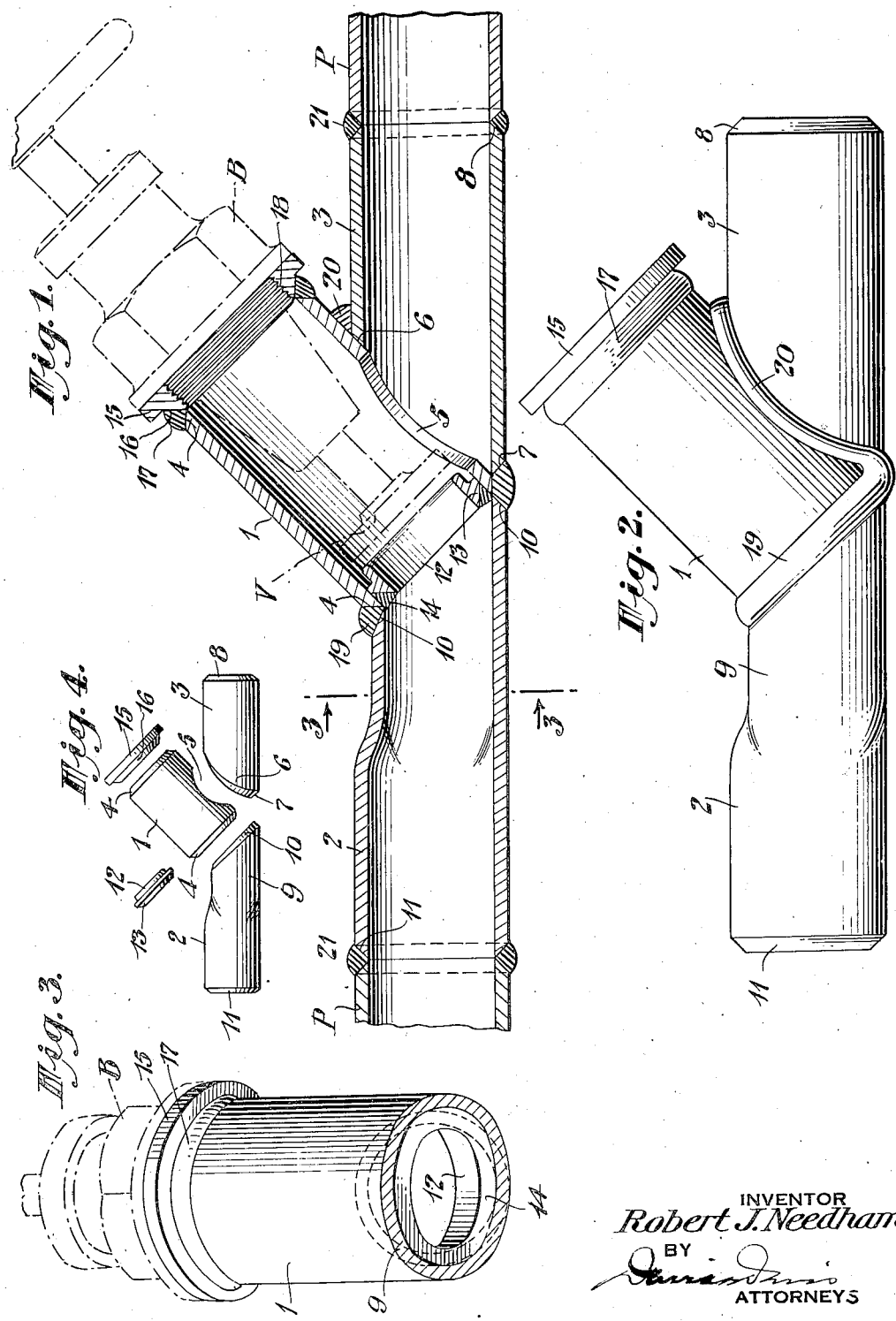
INVENTOR
Robert J. Needham
BY
ATTORNEYS Nov. 14, 1933.  R. J. NEEDHAM  1,935,329
FABRICATED VALVE BODY
Filed Dec. 16, 1929   2 Sheets-Sheet 2
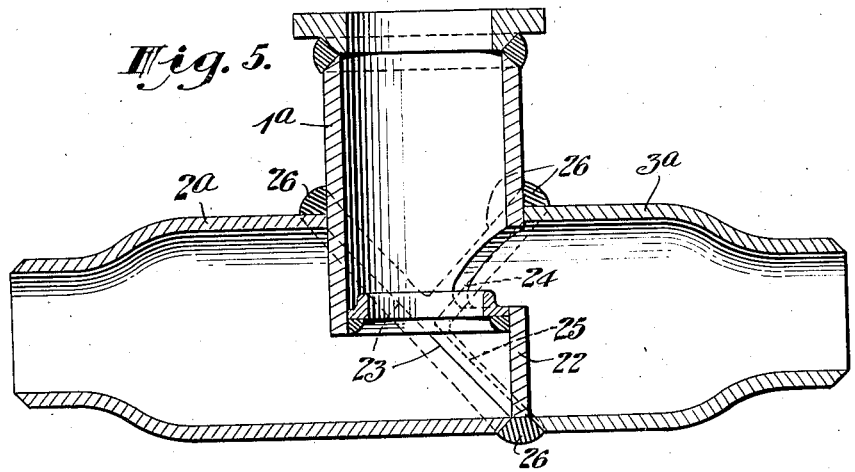
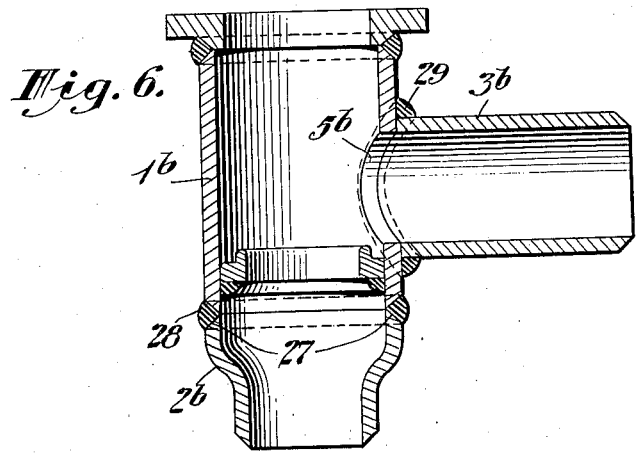
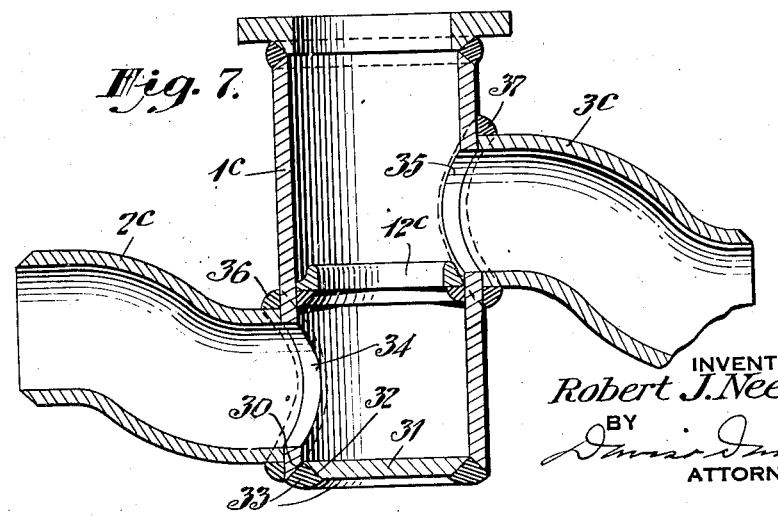
INVENTOR
Robert J. Needham
BY
ATTORNEYS Patented Nov. 14, 1933

1,935,329

UNITED STATES PATENT OFFICE 1,935,329

FABRICATED VALVE BODY

Robert J. Needham, Toronto, Ontario, Canada

Application December 16, 1929
Serial No. 414,447

5 Claims. (Cl. 251—156)

Important objects of the present invention are to produce a thoroughly satisfactory fabricated valve body by welding together a plurality of seamless tubular sections designed to form the valve body when assembled; to facilitate the forming of a valve seat within the valve body; and to effect a reduction in the amount of material contained in the tubular sections of the valve body and at the same time produce a body of great strength.

In the drawings,

Fig. 1 is a longitudinal section of a valve body constructed according to my invention, connected into a pipe line;

Fig. 2 a side view of said valve body;

Fig. 3 a transverse section taken on the line 3—3 of Fig. 1;

Fig. 4 a view upon a reduced scale, showing the sections of the valve body separated; and Figs. 5, 6 and 7 are sectional views of other forms of valve bodies made according to my invention.

In Figs. 1 to 4 inclusive, I have illustrated a valve body of the Y type, embodying my invention. To produce this body I separately form a plurality of seamless tubular sections including a central valve-containing section 1 and pipe-joining end sections 2 and 3 to be united with section 1. Section 1 is straight and cylindrical and is beveled at each end as at 4. Near one end it is formed with a port 5 to register with the section 3. In the assembly the end sections are in straight, longitudinal alinement and the central section is disposed obliquely. Section 3 is cut obliquely at one end as at 6 in a manner to fit the outer cylindrical surface of the oblique section 1, around the port 5, and is beveled as at 7. Its opposite end is cut straight across and is beveled as at 8. The other end section 2 has one end cut obliquely and distorted as at 9 to an elliptical form, so that it will fit one end of the section 1, and is formed with a beveled edge 10. At its opposite end section 2 is cut straight across and formed with an annular beveled surface 11. The three sections are formed of steel or any other suitable weldable material.

Prior to the assembly of the sections 1, 2 and 3 the section 1 is preferably prepared to receive the valve, indicated at V, and its mounting. To this end an annular member 12, shaped to form a valve seat, is fitted into the end of section 1 which is to be inserted between the sections 2 and 3. This annular member is formed of any suitable weldable, non-corrosive metal such as Monel metal, or stainless steel. One face of said seat member is formed with an annular bevel 13 which is opposed to the inner surface of section 1 and combines therewith to form a V-shaped groove. This groove is filled with additional weldable metal 14 which is fused in any suitable manner as by the heat from a gas flame, or from an electric current. This welding process is known as "autogenous" welding and it is performed without hammering or compression. The process is employed also for uniting the sections of the valve body and for joining the latter into a pipe line as will be described hereinafter. It has become customary to apply the term "autogenous" almost exclusively to welding which employs a gas flame but the term is used in this specification and in the claims in its broader sense to include electric welding also. It is also possible to unite the parts by a welding process wherein the welding metal is first separately fused and then poured between the parts to be welded.

Having welded the valve seat 12 in place, another annular member or section 15 is secured to the opposite end of the section 1 and forms part of the valve mounting. It is formed with an annular bevel 16 which is opposed to the bevel 4 upon the section 1 and united thereto by the additional metal 17 welded to the opposed parts by the autogenous process. A thread 18 is cut in the member 15 for engagement with a threaded valve bonnet B and the valve seat 12 and the thread are properly trued with relation to each other so that the valve will accurately fit the seat. The bonnet can also be bolted on, as is usual in the larger types of valves. The mounting of the valve seat and any finishing operations which it is required to perform upon it are greatly facilitated by reason of the convenient location of the seat within the short, straight tube 1 which is open at both ends, gives ready access to a finishing tool and is easily handled.

After the section 1 has been prepared to receive the valve the sections 2 and 3 are welded to the section 1 by the autogenous process. The distorted elliptical end 9 of the section 2 is fitted against the end of the section 1 containing the valve seat, and the additional metal 19 is fused between the opposed beveled edges 4 and 10. The obliquely cut end 6 of the section 3 is fitted against the cylindrical outer surface of section 1 to surround the port 5. Said cylindrical surface and the adjacent outer surface of the section 3 form a groove entirely surrounding section 3, and additional metal 20 is fused thereon. At the under side of the valve body the bevel 4 of the section 1 bridges a space between the bevel 10 and the bevel 7 of the sections 2 and 3 respectively. The additional metal 19 and the metal 20 merge at this point and weld together said three adjoining bevels.

A strong and absolutely leak-proof valve body of simple structure is produced by this method. This body possesses greater strength than a cast body and contains materially less metal. In a casting there are often blow holes which weaken it and cause it to leak when put in service. For this reason and also because of certain difficulties attendant to the forming of castings the walls of the latter are made extremely thick. Consequently much metal is wasted and the cast body is also objectionably heavy. The seamless tubing employed in my fabricated valve body is free from blow holes and possesses greater tensile strength than cast metal. Therefore tubing that is much thinner than a casting may be used with safety.

The completed valve body may readily be joined into a pipe line by autogenous welding of the sections 2 and 3 to pipe sections P by fitting the outer beveled ends of said sections against similar beveled ends of the pipe sections and fusing the metal 21 therebetween. Thereby the flanges, threads, bolts and gaskets usually employed in valve and pipe connections are eliminated and a compact, flush and leakproof joint is produced. The pipe-joining sections 2 and 3 are preferably of considerable length to space the pipe joints materially from the center of the valve body and avoid injury of the valve parts by the welding heat. When it becomes necessary to disconnect the valve body from the pipe line it is only required to fuse the welding metal, which is easily and quickly done. Such a valve body can be made from special materials which may be welded or drawn but which do not readily lend themselves to the casting process.

In Fig. 5 is shown another type of fabricated valve body. Here the central section 1ª is disposed at right angles to the alining end sections 2ª and 3ª and extends into the opposed inner ends thereof. The inner end of the section 1ª is cut to provide an extension 22 which forms a partition below the valve seat 12ª. At its inner end the section 2ª is cut obliquely as at 23 to fit around the cylindrical surface of section 1ª and also alng the edge of extension 22. The inner end of section 3ª is cut in two converging directions as at 24 and 25 to fit the cylindrical surface of section 1ª and the edge of the extension 22. Grooves are formed by said fittings or intersections and additional metal 26 is fused therein to weld the three sections together. The sections 2ª and 3ª must be larger in this case to accommodate the central section 1ª, and their outer ends are contracted to fit the line pipes. Otherwise the structure is similar to that first described.

In Fig. 6 is shown a fabricated valve body of the angle type. One of the pipe-joining sections 2ᵇ, is here cut straight across, beveled as at 27 and welded directly to one of the beveled ends of the valve-containing sections 1ᵇ as at 28. The outer end of section 2ᵇ is contracted and formed for welding to the line pipe. The other pipe-joining section 3ᵇ is formed to fit the cylindrical outer surface of section 1ᵇ, around the port 5ᵇ, and is welded as at 29. Otherwise the structure is similar to that of the first form.

Still another type of valve body is shown in Fig. 7. Here the central section 1ᶜ is formed at its lower end with an inwardly directed bevel 30. This end is closed by a disk 31 which fits in said end and is formed with a beveled edge 32 opposed to the bevel 30 and combining with the latter to form a groove. Metal 33 is fused in said groove to weld the disk in place. The valve seat 12ᶜ is spaced well above the disk 31 and between the seat and the disk the section 1ᶜ is formed with a port 34. Another port 35 is formed in the opposite side of the section, above the valve seat. A pipe-joining section 2ᶜ is formed at one end to fit the outer cylindrical surface of the section 1ᶜ, around the port 34 and is welded as at 36. Similarly, another pipe-joining section 3ᶜ is formed to fit the outer surface of section 1ᶜ, around the port 35 and is welded as at 37. The two pipe-joining sections are bent to bring their outer ends into alinement with each other and with a pipe line. The outer ends are formed for autogenous welding to the sections of a pipe line. In all of the valve bodies shown and described the tubular sections are seamless.

While I have shown and described several satisfactory forms of my invention, the latter is susceptible of other variations without departing from the spirit thereof. Therefore I do not wish to be limited strictly to this disclosure but reserve the right to make such changes as will lie within the scope of the claims.

What I claim is:

1. A fabricated valve body formed of seamless tubing sections comprising a valve chamber section having a flange welded at one end and a valve seat welded on the inner surface of the chamber at the other end, said chamber section being provided with a lateral opening, an inlet section of seamless tubing welded to the valve chamber section over said opening, and an outlet section of seamless tubing welded to the valve chamber section on the discharge side of said valve seat.

2. A fabricated valve body formed of seamless tubing sections and comprising a seamless tubing valve chamber section having a lateral opening, a pair of seamless tubing inlet and outlet sections disposed in longitudinal alinement, the valve chamber section being disposed obliquely to said pair of sections and one section of the pair being welded to an end of the valve chamber section and the other welded to the valve chamber section around said lateral opening, a valve seat welded in the valve chamber section at said end of the latter, and a flange welded to the opposite end of the valve chamber section.

3. A fabricated metallic valve body comprising a seamless tubing valve chamber section, a seamless tubing inlet section, a seamless tubing outlet section, and a valve seat section enclosed by said valve chamber section, said chamber section having one opening around which the inlet section is directly welded to the chamber section and another opposed opening around which the outlet section is directly welded to the chamber section in endwise alignment with the inlet section, the valve seat section being directly welded to one of said three tubing sections and located between the opposed adjoining ends of the inlet and outlet sections.

4. A fabricated metallic valve body comprising a seamless tubing valve chamber section, a seamless tubing inlet section, a seamless tubing outlet section, and a valve seat section located within said valve chamber section, said chamber section having one opening around which said inlet section is directly welded to the chamber section and another opening around which said outlet section is directly welded to the chamber section, the valve seat section being directly welded to one of the three tubing sections and located between the adjoining ends of the inlet and outlet sections.

5. A fabricated metallic valve body comprising a seamless tubing valve chamber section having a lateral opening, a pair of seamless tubing inlet and outlet sections disposed in longitudinal alignment, the valve casing section being disposed obliquely to said pair of sections and one section of the pair being welded to an end of the valve chamber section and the other welded to the valve chamber section around said lateral opening, and a valve seat welded in the valve chamber at said end of the latter.

ROBERT J. NEEDHAM.